United States Patent
Faqihi et al.

(10) Patent No.: US 12,065,969 B2
(45) Date of Patent: Aug. 20, 2024

(54) EXHAUST DUCT FOR A GAS TURBINE ENGINE

(71) Applicant: General Electric Technology GmbH, Baden (CH)

(72) Inventors: Bouria Mohamed Faqihi, Dubai (AE); Deoras Prabhudharwadkar, Jebel Ali (AE); Jalal Zia, Dammam (SA); Fadi Ghaith, Dubai (AE)

(73) Assignee: General Electric Technology GMBH, Baden (CH)

( * ) Notice: Subject to any disclaimer, the term of this patent is extended or adjusted under 35 U.S.C. 154(b) by 21 days.

(21) Appl. No.: 17/304,352

(22) Filed: Jun. 18, 2021

(65) Prior Publication Data

US 2021/0396156 A1    Dec. 23, 2021

(30) Foreign Application Priority Data

Jun. 23, 2020  (EP) ...................... 20181760

(51) Int. Cl.
*F02C 7/10* (2006.01)
*F01D 25/30* (2006.01)
(Continued)

(52) U.S. Cl.
CPC ............... *F02C 7/08* (2013.01); *F01D 25/30* (2013.01); *F01N 5/02* (2013.01); *F02C 6/16* (2013.01);
(Continued)

(58) Field of Classification Search
CPC .......... F01D 25/305; F01D 25/30; F01N 5/02; F02C 7/045; F02C 7/08; F02C 7/10;
(Continued)

(56) References Cited

U.S. PATENT DOCUMENTS 3,235,001 A    2/1966    Giannotti
5,845,481 A *  12/1998   Briesch .................. F02C 7/224
                                                           60/776
(Continued)

FOREIGN PATENT DOCUMENTS

CH      701236 A1      12/2010
DE      2855219 A1     10/1980
WO      2014179821 A1  11/2014

OTHER PUBLICATIONS

European Search Report for Application No. EP 20 18 1760, dated Sep. 14, 2020, 2 pages.

*Primary Examiner* — Gerald L Sung
*Assistant Examiner* — Rene D Ford
(74) *Attorney, Agent, or Firm* — Charlotte Wilson; James Pemrick; Hoffman Warnick LLC

(57) ABSTRACT

Disclosed is an exhaust duct (1) for a gas turbine engine (50), comprising a silencer section (12). At least two plate-shaped silencer baffles (20) are provided inside the silencer section (12). At least one of the plate-shaped silencer baffles is configured as a heat exchange device in that it comprises at least one internal cavity (22) suitable for receiving a heat exchange fluid and leakproof with respect to the interior of the exhaust duct, wherein the at least one internal cavity is fluidly connected to the outside of the exhaust duct at an inlet port and an outlet port (23, 24). This device is useful for recuperating exhaust heat from exhaust gases of the gas turbine engine without the expense and additional space required for providing a heat recovery steam generator.

4 Claims, 7 Drawing Sheets

(51) Int. Cl.

| | |
|---|---|
| *F01N 5/02* | (2006.01) |
| *F02C 6/16* | (2006.01) |
| *F02C 7/045* | (2006.01) |
| *F02C 7/08* | (2006.01) |
| *F02C 7/224* | (2006.01) |
| *F02C 6/08* | (2006.01) |

(52) U.S. Cl.
CPC ............... *F02C 7/045* (2013.01); *F02C 7/10* (2013.01); *F02C 7/224* (2013.01); *F01D 25/305* (2013.01); *F02C 6/08* (2013.01); *F05D 2240/126* (2013.01); *F05D 2250/185* (2013.01); *F05D 2260/213* (2013.01); *F05D 2260/232* (2013.01); *F05D 2260/96* (2013.01)

(58) Field of Classification Search
CPC .... F02C 7/224; F02C 6/08; F02C 7/24; F02C 3/04; F02C 6/00; F02C 6/18; F05D 2240/126; F05D 2250/185; F05D 2260/213; F05D 2260/232; F05D 2260/96; F05D 2220/60; F05D 2250/312; F22B 1/1815

See application file for complete search history.

(56) References Cited

U.S. PATENT DOCUMENTS

| | | |
|---|---|---|
| 8,069,660 B1 | 12/2011 | Cone et al. |
| 2003/0019214 A1* | 1/2003 | Shibata ................. F28D 9/0068 60/39.511 |
| 2003/0159807 A1* | 8/2003 | Ayres .................... F28F 9/0246 165/81 |
| 2010/0107595 A1 | 6/2010 | Hardwicke |
| 2013/0327052 A1 | 12/2013 | O'Neill et al. |
| 2014/0102113 A1* | 4/2014 | Cuevas ................... F02C 7/047 60/39.093 |
| 2017/0292795 A1 | 10/2017 | Waissi |
| 2018/0135467 A1 | 5/2018 | Zhang et al. |
| 2018/0230911 A1 | 8/2018 | Pastouchenko |
| 2019/0186361 A1* | 6/2019 | Gerstler .................... F02C 7/08 |
| 2019/0195131 A1 | 6/2019 | Zia et al. |
| 2019/0277579 A1* | 9/2019 | Disori ..................... F28F 3/025 |

* cited by examiner

EXHAUST DUCT FOR A GAS TURBINE ENGINE

CROSS-REFERENCE TO RELATED APPLICATIONS

This application claims priority pursuant to 35 U.S.C. 119(a) to European Patent Application No. 20181760.8, filed Jun. 23, 2020, which application is incorporated herein by reference in its entirety.

TECHNICAL FIELD

The present disclosure relates to an exhaust duct for a gas turbine engine of the type set forth in the claims.

BACKGROUND OF THE DISCLOSURE

The exhaust gases of gas turbine engines, after exiting the expansion turbine, still are at several hundred degrees Celsius, and typically may be in a range from 500° C.-600° C. under high part load and full load conditions in contemporary gas turbine engines. Hence, with the exhaust gases large enthalpy flows, which had, prior to expansion in the expansion turbine, been added in combusting fuel, are discharged into the atmosphere and get lost for technical use. The resulting loss of enthalpy negatively impacts efficiency.

It is known from the art to recover exhaust enthalpy of gas turbine engines in a heat recovery steam generator and to use the thereby generated steam in a steam turbine to generate electricity. The steam may also be used for industrial purposes. However, building a combined cycle power plant, wherein a steam turbine as a bottoming cycle uses the exhaust energy from the gas turbine engine, requires a significant capital investment which makes this technology, despite the superior overall efficiency, only economically attractive if the plant can be operated at least essentially as a base load power plant, for instance more than 5000 hours a year and at a high power output of, for instance, at least 75% of the rated power output. Moreover, the numerous installations inside the exhaust duct yield an additional pressure loss, hence in turn reducing the efficiency and power output of the gas turbine engine itself. In addition, a heat recovery steam generator requires space that might not always be available. In particular, installing a heat recovery steam generator may not be an option to add to an existing single cycle gas turbine engine power station.

US 2013/0327052 teaches to connect multiple gas turbine engines to a common stack and arrange a heat exchanger in the common stack. The document furthermore teaches to provide a heat exchanger in the common stack and to improve heat transfer from the exhaust gas to the heat exchanger by introducing a non-laminar flow through the common exhaust stack and further by applying dew point control.

U.S. Pat. No. 8,069,660 discloses a heat recovery system, which is integrated within silencing chambers. According to the teaching of the document, an exhaust flow first enters a first silencing chamber and is then divided into two partial flows. A first of said partial flows is conveyed from the first silencing chamber to a second silencing chamber and from there to a third silencing chamber. The second of said partial flows is directly led to the third silencing chamber, bypassing the second silencing chamber. Said second partial flow thereby flows through conduits which are arranged around the silencing chambers in a heat recovery flow path formed between an inner housing and a heat recovery outer housing. A heat transfer fluid is guided through the heat recovery flow path to exchange heat with the exhaust gases in the silencing chambers through the inner wall, and with the second partial flow of exhaust gas flowing through the conduits, with the heat transfer fluid flowing around the conduits. The teaching of said document does not specifically refer to the use in connection with gas turbine engines.

U.S. Pat. No. 3,235,001 teaches a combined silencer and heat exchange device suitable for being attached to an outlet or to an inlet of the combustion engine. The combined silencer and heat exchange device comprises a housing. At a front side of the housing, a front panel partially closes the housing and leaves a front inlet open, which is formed between the front panel and outer side panels of the housing. At the back side of the housing, the interior of the housing is connected to an engine inlet, whereby a back inlet is formed around a duct connecting the interior of the housing to the engine inlet and the outer side panels of the housing. As such, a flow of fluid may enter the interior of the housing through the back and front inlets and is deflected radially inwardly to the center of the housing and from there to the engine inlet. A heat exchanger assembly is provided inside the housing, wherein the heat exchanger assembly comprises tubes having square fins on their outside so as to improve heat exchange between the flow around the tubes and the tubes.

SUMMARY

It is an object of the present disclosure to provide means enabling the recovery of exhaust heat from a gas turbine engine. It is a more specific object of the presently disclosed subject matter to provide an exhaust duct for a gas turbine engine of the type initially mentioned. In one aspect, an exhaust duct for a gas turbine engine shall be provided, which enables recovery of waste heat from the exhaust gases without adding additional installations inside the exhaust duct that would result in pressure losses. In another aspect, the heat exchange device shall be integrated in an already existing installation in the exhaust duct. In still a further aspect, the heat exchange device shall be provided such that it yields low additional capital investment.

This is achieved by the subject matter described in claim 1.

Further effects and advantages of the disclosed subject matter, whether explicitly mentioned or not, will become apparent in view of the disclosure provided below.

Accordingly, disclosed is an exhaust duct for a gas turbine engine, the exhaust duct comprising a silencer section having an inlet and an outlet and a flow direction from the inlet to the outlet. The flow direction may be determined by geometry, aerodynamic design and so forth. It is understood that the inlet is configured for being arranged closer to the exhaust outlet of the gas turbine engine than the outlet of the silencer section. At least two plate-shaped silencer baffles are provided inside the silencer section and are arranged parallel to each other. Each silencer baffle extends along the flow direction of the silencer section from an upstream edge to a downstream edge. Each of the at least two plate-shaped silencer baffles has side surfaces extending along the flow direction of the silencer section from the upstream edge to the downstream edge. The upstream edge may in particular be rounded and form a so-called "bullnose" of the baffle for aerodynamic reasons. The side surfaces of the silencer baffles further extend across the flow cross section of the silencer section. Two side surfaces of two adjacent plate-shaped silencer baffles are arranged facing each other and form an exhaust flow channel between them. At least one of the plate-shaped silencer baffles is configured as a heat exchange device in that it comprises at least one internal cavity suitable for receiving a heat exchange fluid. The skilled person will appreciate that an internal cavity suitable for receiving a heat exchange fluid is leakproof with respect to the interior of the exhaust duct. The at least one internal cavity is fluidly connected to the outside of the exhaust duct at an inlet port and an outlet port. In particular, the inlet and outlet ports extend through a side wall or through side walls of the exhaust duct.

The baffles, which are configured as heat exchange devices, may in the following also be referred to as heat exchange baffles or as heat exchange silencer baffles.

It is noted that, within the framework of the present disclosure, the use of the indefinite article "a" or "an" does in no way stipulate a singularity, nor does it exclude the presence of a multitude of the named member or feature. It is thus to be read in the sense of "at least one" or "one or a multitude of".

In embodiments, the at least one internal cavity may be provided as at least one internal duct fluidly connected to the outside of the exhaust duct, i.e., through the walls of the exhaust duct. In exemplary embodiments, at least one internal duct extends adjacent and along the leading edge of at least one plate-shaped silencer baffle and may extend from an inlet port to an outlet port. Likewise, it may be provided that at least one internal duct extends in a serpentine shape inside at least one silencer baffle, and may extend from an inlet port to an outlet port.

In further herein disclosed exemplary embodiments, the side surfaces of at least one silencer baffle are provided on side walls, wherein each side wall is provided as a hollow body having two sheets with a space left between the sheets, wherein each of said sheets is perforated by a multitude of openings, and the openings on the sheets of a side wall are connected by a tube bridging the space so as to fluidly connect the two opposite sides of the side wall through the tubes. The tubes do not necessarily have circular cross sections. The connections of the tubes to the sheets hermetically seal with the respective sheet. As such, the cavity suitable for receiving a heat exchange fluid is formed inside the side walls in the space between the sheets and outside the tubes.

In further herein disclosed exemplary embodiments, all internal cavities which are suitable for receiving heat exchange fluid, of all silencer baffles having internal cavities suitable for receiving heat exchange fluid, i.e., configured as a heat exchange device, are connected to two common headers, wherein each internal cavity for heat exchange fluid fluidly connects the two common headers. Considering that the internal cavities are intended for a throughflow of heat exchange fluid, the headers may be referred to as an inlet header and an outlet header.

Further disclosed is a gas turbine engine, wherein an exhaust side of an expansion turbine is connected to an exhaust duct of the type described above. Still further disclosed is a power station comprising at least one gas turbine engine as disclosed, i.e., wherein an expansion turbine is connected to an exhaust duct of the type described above.

The power station may, besides the gas turbine engine, comprise a compressed air energy storage, CAES, system, wherein the inlet ports of the silencer baffles configured as heat exchange devices are fluidly connected to a CAES storage tank, and the outlet ports of the silencer baffles configured as heat exchange devices are fluidly connected to a CAES expansion turbine.

In further embodiments, the power station may essentially be a power station of the type disclosed in US 2019/0195131. The power station comprises, besides the gas turbine engine, a turbocharging appliance, wherein the turbocharging appliance comprises at least one low pressure compressor, at least one high pressure compressor, and at least one turbine for driving said compressors. Each compressor may be arranged on a common shaft with and driven by an individual turbine. The turbocharging appliance then may comprise at least one low pressure turbocharger and one or more high pressure turbochargers, wherein a compressor of a low pressure turbocharger delivers fluid into a high pressure compressor. It may be the case that multiple low pressure turbochargers are arranged in parallel to each other and in series with one single high pressure turbocharger, so as to, for instance, use identical turbochargers while accounting for the different volume flows in the high pressure and low pressure compressors. In other embodiments, it may be provided that one or more high pressure compressors and one or more low pressure compressors are fluidly arranged such that a compressor of a low pressure turbocharger delivers fluid into a high pressure compressor, while being provided on a common shaft with a, and in particular with one single, turbine for driving the compressors. A compressor outlet of the at least one low pressure compressor is fluidly connected to the inlet ports of the silencer baffles configured as heat exchange devices and to a compressor inlet of the at least one high pressure compressor. An intercooler may be fluidly interposed between the compressor outlet of the at least one low pressure compressor and the compressor inlet of the at least one high pressure compressor. The outlet ports of the silencer baffles configured as heat exchange devices are fluidly connected to a turbine inlet of the at least one turbine of the turbocharging appliance. A turbine outlet of the at least one turbine of the turbocharging appliance is fluidly connected to a back pressure control device, and a compressor outlet of the at least one high pressure compressor is connected to the working fluid flow path of the gas turbine engine downstream the compressor of the gas turbine engine and upstream the combustor of the gas turbine engine, i.e., fluidly connected to a combustor of the gas turbine engine. Thus, the waste heat recovered in the heat exchange baffles may be used to drive external compressors for supplying additional air to the combustor of the gas turbine engine and thus enhance the turbine output of the gas turbine engine and/or reduce the flow through the compressor of the gas turbine engine, thus reducing the power consumption of the compressor of the gas turbine engine. The back pressure valve is utilized to control the discharge pressure of the high pressure compressor of the turbocharging device.

In still further embodiments of the herein disclosed power station, the silencer baffles configured as heat exchange devices are, through their inlet and outlet ports, fluidly interposed between a compressor and a combustor of the gas turbine engine, whereby the silencer baffles configured as heat exchange devices are configured to receive at least a part of the fluid flow from the compressor to the combustor. In more specific embodiments, the compressor is a supplemental compressor different from the compressor of the gas turbine engine, and the compressor is in particular motor-driven. During part load operation, the compressor may charge a battery, which is used during periods of high power demand to supply a motor for driving the supplemental compressor and to augment power output of the gas turbine engine.

In embodiments of the herein disclosed power station, the gas turbine engine is equipped with an inlet air preheating circuit comprising an inlet air preheat heat exchanger provided upstream of the compressor of the gas turbine engine. One exemplary, specific, non-limiting, embodiment of a gas turbine engine equipped with an inlet air preheat heat exchanger is disclosed in US 2018/0135467. The silencer baffles configured as heat exchange devices are, through their inlet and outlet ports, integrated into the inlet air preheating circuit so as to flow a fluid contained in the inlet air preheating circuit through the internal cavities for heat exchange fluid provided inside the heat exchange silencer baffles. Said application might be found useful to enhance part-load efficiency of the gas turbine engine or might otherwise allow the gas turbine engine to be operated in a normal operation mode at low percentages of ISO rated power output.

In still other embodiments of the herein disclosed power station, the gas turbine engine is equipped with a fuel preheating circuit, wherein the fuel preheating circuit comprises a fuel preheat heat exchanger provided upstream of a combustor of the gas turbine engine in a fuel flow path. The silencer baffles configured as heat exchange devices are, through their inlet and outlet ports, integrated into the fuel preheating circuit so as to flow a fluid contained in the fuel preheating circuit through the internal cavities for heat exchange fluid provided inside the heat exchange silencer baffles.

In still other embodiments of the herein disclosed power station, a compressor of the gas turbine engine comprises a bleed port downstream the compressor inlet and upstream the compressor outlet. A first line extends from the bleed port to the low pressure inlet port of an external compressor, whereby said first line fluidly connects the bleed port to the low pressure inlet port of the external compressor. A second line is connected to the high pressure outlet port of the external compressor and fluidly connects the high pressure outlet port of the external compressor and the inlet ports of the silencer baffles configured as heat exchange devices. A third line is connected to at least one of the high pressure outlet of the compressor of the gas turbine engine and a combustor of the gas turbine engine and fluidly connects the outlet port of the silencer baffles configured as heat exchange devices and the high pressure outlet of the compressor of the gas turbine engine and/or the combustor of the gas turbine engine.

It is understood that the features and embodiments disclosed above may be combined with each other. It will further be appreciated that further embodiments are conceivable within the scope of the present disclosure and the claimed subject matter, which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a perspective view of an exemplary embodiment of an exhaust duct of a gas turbine engine.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION OF THE INVENTION

The herein described subject matter will be more appreciated by a person having ordinary skill in the art by virtue of exemplary embodiments shown in the accompanying drawings and outlined below. It shall be understood that these exemplary embodiments are merely shown for illustrative purposes to enable a better appreciation of the herein described subject matter and shall be understood as not limiting the subject matter outlined in the claims.

Figure 1:
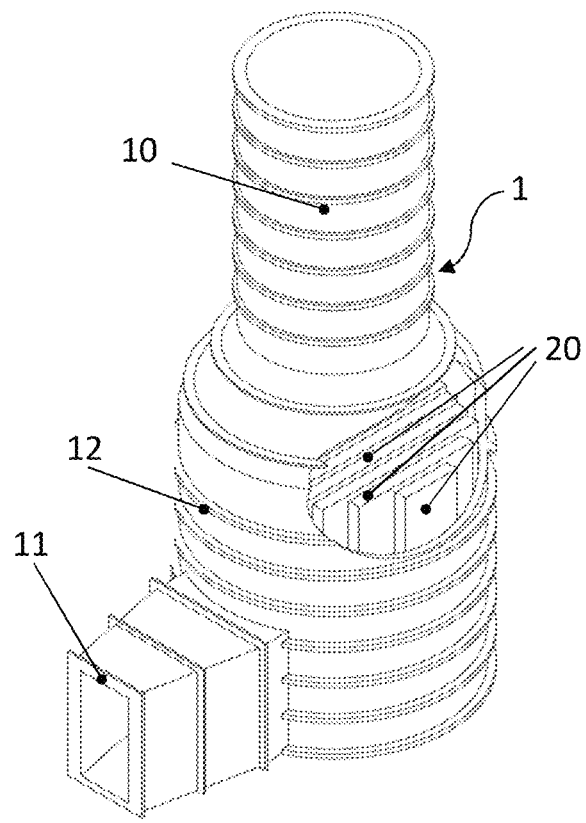

FIG. 1 shows an example of an exhaust duct 1 of a gas turbine engine. The exhaust duct 1 comprises a stack 10. An exhaust duct transition section 11 is configured to connect with the downstream end of the gas turbine engine 50 (shown schematically in FIGS. 8-12). A silencer section 12 of the exhaust duct comprises silencer baffles 20, which are visible in the present part-sectional view. In the depicted example, the stack 10 and the silencer section 12 have rounded cross-sections, while the exhaust duct transition section 11 is shown with a rectangular cross-section. However, it is well possible that any of the stack 10 and the silencer section 12 may exhibit a rectangular cross-section, and it might be provided that the exhaust duct transition section 11 exhibits a round or circular cross-section. Likewise, while the silencer section 12 is exemplarily shown to be arranged in a vertical section of the exhaust duct 1, the silencer section 12 may also be arranged in a horizontal section of the exhaust duct 1. These facts are readily familiar to a person having skill in the art.

Figure 2:
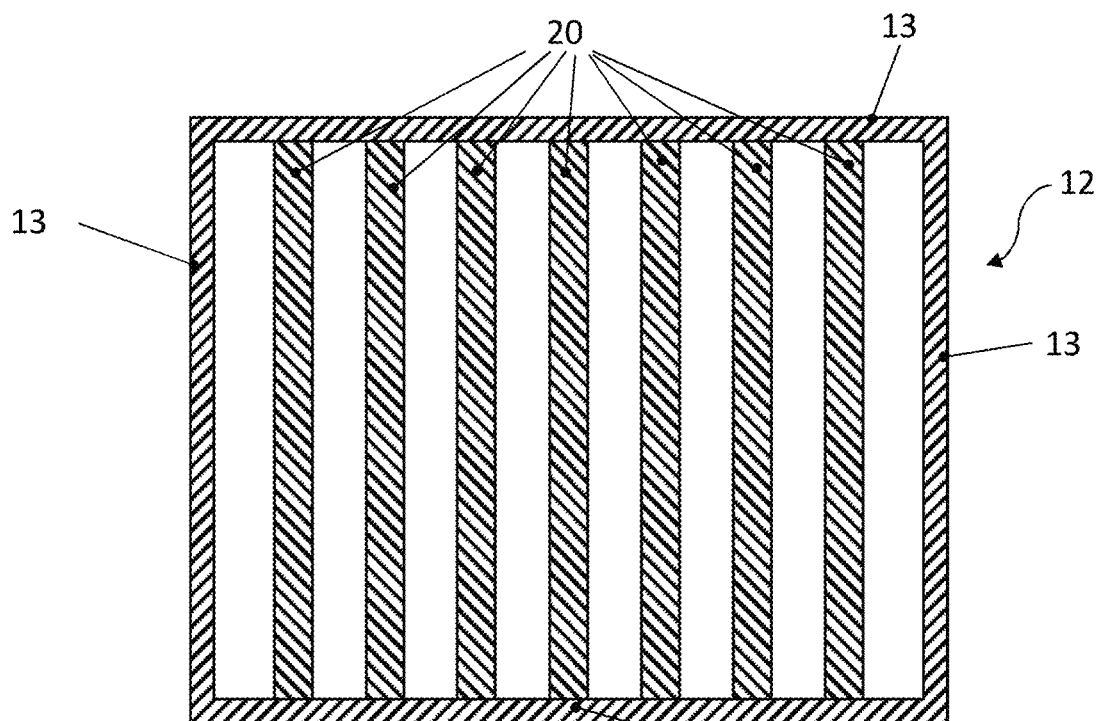
FIG. 2 a cross-sectional view of a silencer section of an exhaust duct of a gas turbine engine having a rectangular cross-section.

FIG. 2 depicts, by way of example, a cross-sectional view of a silencer section 12 having a rectangular cross-section. The exhaust duct 1 is defined by duct walls 13. As will be appreciated, the flow of exhaust gas in silencer section 12 is perpendicular to the plane of drawing. A multitude of silencer baffles 20 are arranged across the cross-section of the exhaust duct 1 and are essentially parallel to each other, whereby two neighboring silencer baffles 20 form a flow channel between them. According to the herein disclosed subject matter, at least one of the silencer baffles 20, and in some embodiments each of the silencer baffles 20, is configured as a heat exchange device, or a heat exchange silencer baffle, as will be outlined in more detail below.

Figure 3:
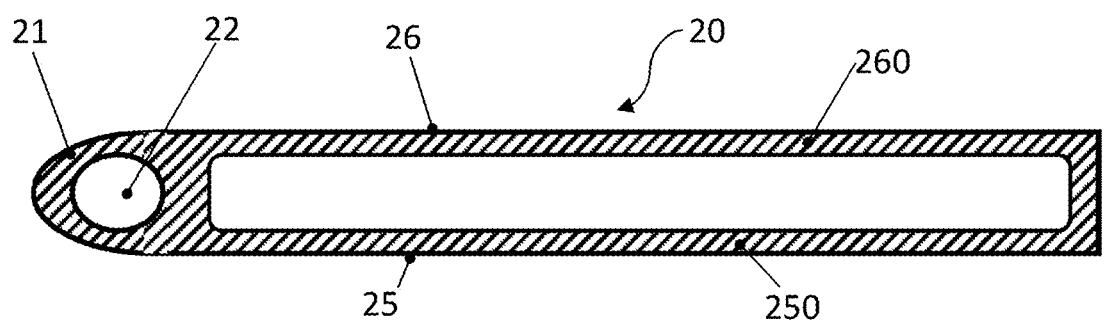
FIG. 3 a cross-sectional view through a first exemplary embodiment of a heat exchange silencer baffle.

Generally speaking, a silencer baffle 20 is configured as a heat exchange device in that it comprises at least one internal cavity suitable for receiving a heat exchange fluid. The skilled person will appreciate that an internal cavity for receiving a heat exchange fluid is leakproof with respect to the interior of the exhaust duct 1, such that no heat exchange fluid may leak from the internal cavity of the silencer baffle 20 into the exhaust duct 1. The at least one internal cavity is fluidly connected to the outside of the exhaust duct 1. FIG. 3 shows a cross-sectional view through a first exemplary embodiment of a silencer baffle 20 configured as a heat exchange device, wherein the cross section is taken perpendicular to the side surfaces 25 and 26 of the baffle. The side surfaces extend across the exhaust duct 1 in the silencer section 12 and along the flow direction of the silencer section 12 from an upstream edge 21 to a downstream edge. The flow of exhaust gases would be from left to right in the drawing. In particular embodiments, the upstream edge 21 of the silencer baffle 20 is rounded to form a so-called bullnose section of the silencer baffle 20, so as to reduce aerodynamic drag and hence to reduce pressure loss in the silencer section 12. In the shown embodiment, an internal cavity 22 suitable for receiving a heat exchange fluid is provided as a duct extending along the leading (or upstream) edge 21 of the silencer baffle 20, in the bullnose section of the silencer baffle 20. Duct 22 extends along the entire "span width" of the silencer baffle 20 and has open ends that are provided with ports, which, when the baffle 20 is installed in the silencer section 12, extend through the walls of the exhaust duct 1 so as to provide fluid communication of duct 22 with the outside of the exhaust duct 1. While said ports are not shown in the present depiction, they are readily apparent to a person having ordinary skill in the art. Downstream of the bullnose section, baffle 20 is hollow, between side walls 250 and 260. Side surfaces 25, 26 are located on the outer sides of side walls 250, 260, respectively.

Figure 4:
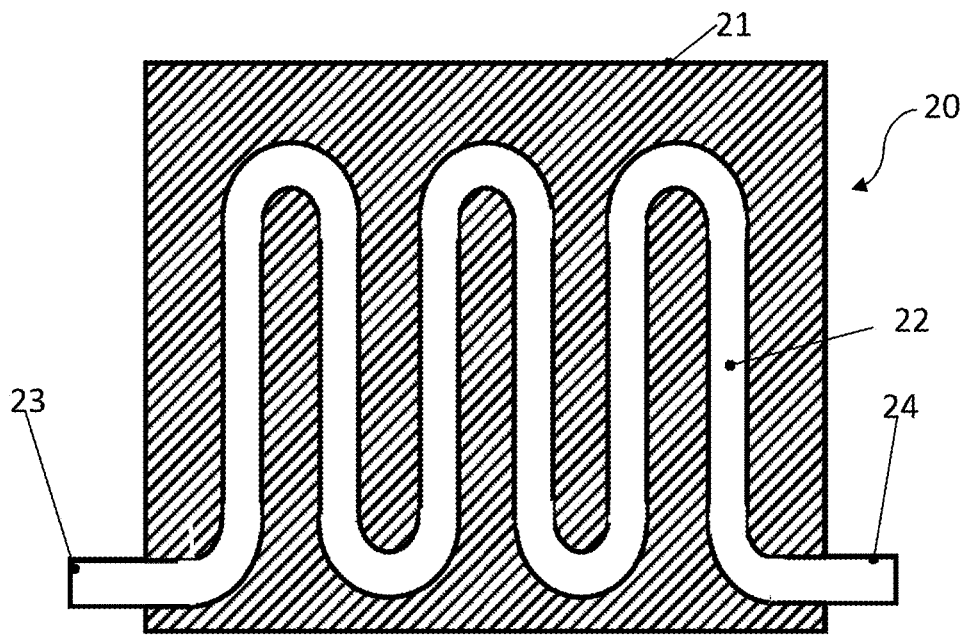
FIG. 4 a sectional view of a second exemplary embodiment of a heat exchange silencer baffle.

FIG. 4 shows a second embodiment of a silencer baffle 20 configured as a heat exchange device, in a section taken parallel to the main surfaces of the baffle 20. Internal cavity 22 is, in this exemplary embodiment, provided as a duct meandering inside the baffle, between the side surfaces 25, 26. Duct 22 is fluidly connected to ports 23 and 24, which may be referred to as inlet port and outlet port, respectively. Heat exchange ducts of the kind exemplarily shown in FIG. 4 may also be provided in the inner lining of the exhaust stack walls 13, which walls are for instance depicted in FIG. 2 described above or FIG. 7 referenced below. While the ducts inside the exhaust stack walls are not explicitly shown, they are, by virtue of the present disclosure, readily apparent to a person having ordinary skill in the art.

It will be appreciated that both types of ducts shown in FIGS. 3 and 4 may be combined in one single baffle 20.

Figure 5:
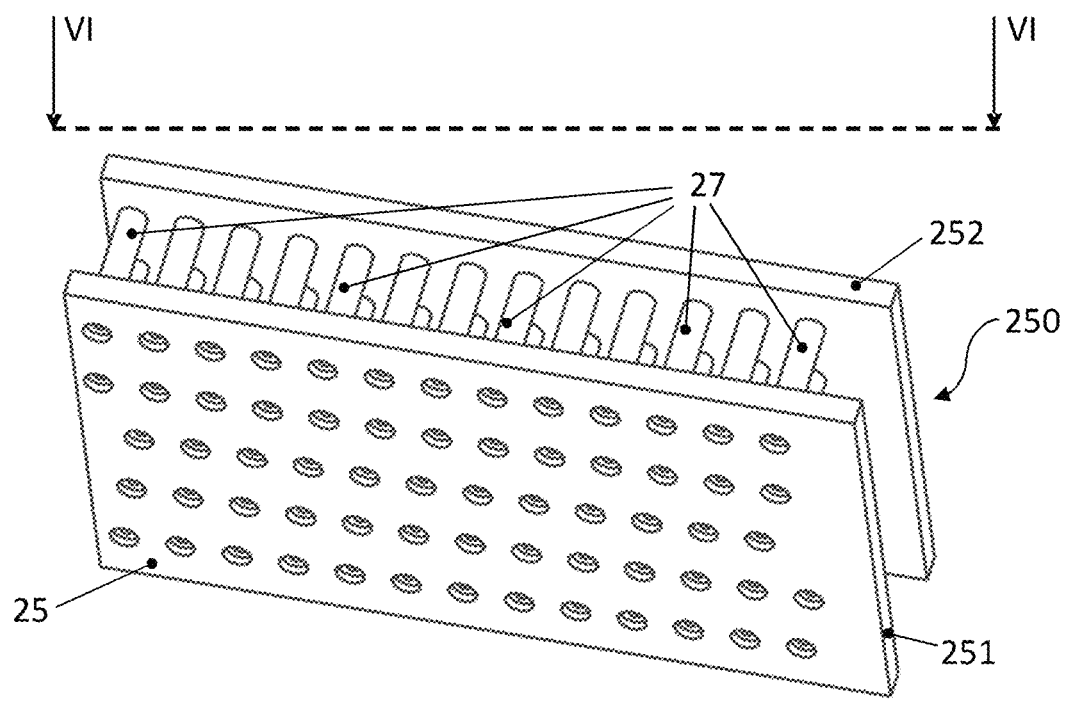
FIG. 5 a perspective view of a third exemplary embodiment of a heat exchange silencer baffle.
Figure 6:
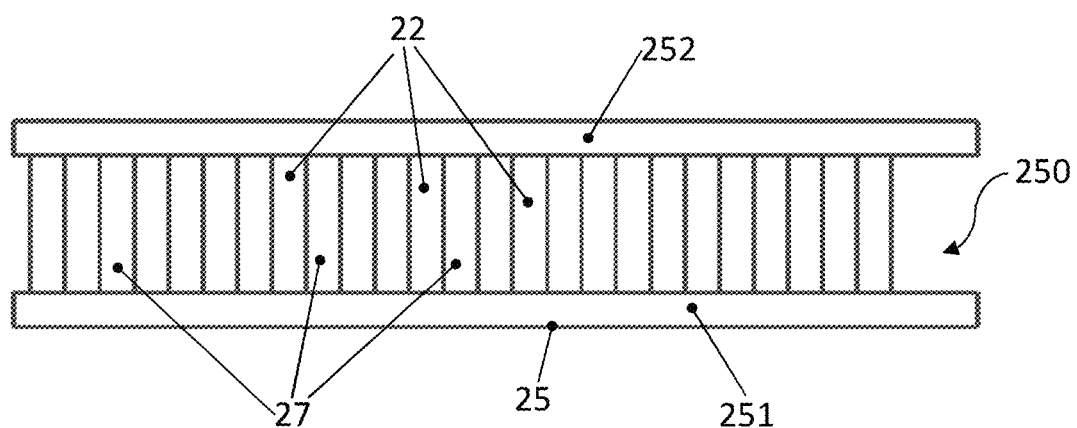
FIG. 6 another sectional view of the baffle depicted in FIG. 5.

In an embodiment shown in FIGS. 5 and 6, the side walls 250, 260 of the baffle 20, of which the side wall 250 is depicted in more detail, are provided as hollow bodies formed between sheets 251, 252 with a space left between the sheets. While only one hollow body side wall 250 is depicted, the skilled person will readily appreciate that side wall 260 may be identical. Side wall 250 comprises sheets 251, 252 spaced apart from each other, such that side wall 250 itself constitutes a hollow body. Side surface 25 of the baffle 20 is provided on the outer side of sheet 251.

FIG. 6 shows a cross-sectional view of side wall 250 in the view direction designated by "VI-VI" in FIG. 5. Each of sheets 251, 252 is perforated by a multitude of openings, and openings on the two sheets 251, 252 of side wall 250 are aligned with each other. Each pair of oppositely disposed openings is connected by a tube 27 bridging the space between the sheets 251, 252. The tubes 27 thus fluidly connect the two opposite sides of side wall 250 through the tubes 27. Further, the tubes 27 hermetically seal with the respective sheet 251, 252 so as to form the cavity 22 suitable for receiving a heat exchange fluid in the space between the two sheets 251, 252 and outside the tubes 27.

Figure 7:
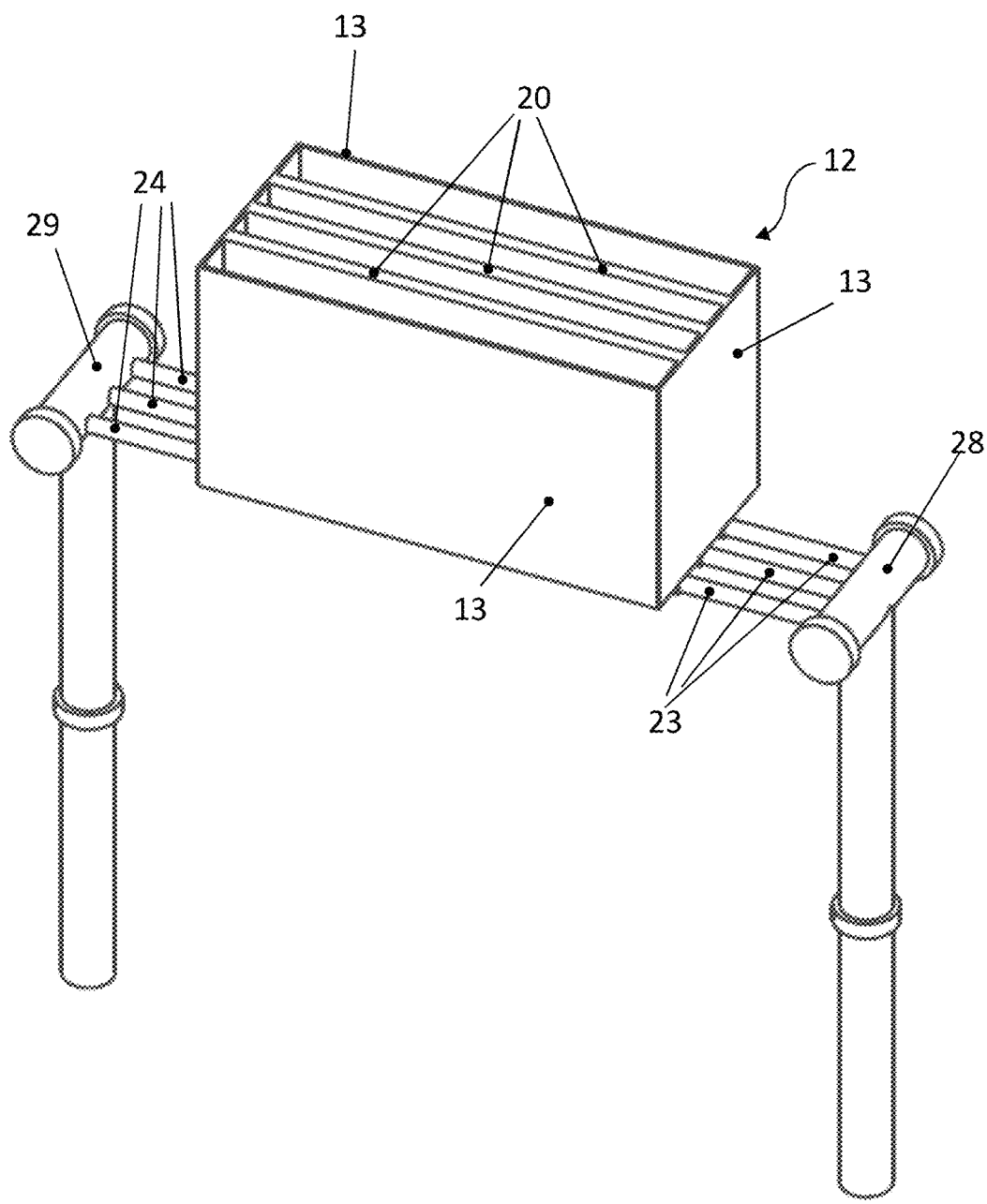
FIG. 7 a section of a heat exchange silencer section of an exhaust duct in an isometric view, outlining the connection of the heat exchange baffles to inlet and outlet headers.

FIG. 7 shows a section of a heat exchange silencer section 12 of an exhaust duct 1 in an isometric view, and further illustrating the fluid connection of the heat exchange baffles 20. As outlined above, baffles 20 are arranged in a portion of exhaust duct 1, which is formed by duct walls 13. Outside the exhaust duct, headers 28 and 29 are connected to feed and return lines. Ports 23 and 24 extend through duct walls 13 and connect the internal cavities 22 for receiving heat exchange fluid inside the baffles 20 to headers 28 and 29. As will be readily appreciated, there may in particular be one port 23 and one port 24 associated with each heat exchange baffle 20. It goes without saying that the number of heat exchange baffles 20 as well as the number of ports 23 and 24, respectively, may be different than shown in the exemplary embodiment. Thus, heat exchange baffles 20 are connected to feed and return headers 28, 29.

A gas turbine engine 50, wherein an exhaust side of an expansion turbine 53 is fluidly connected to a heat exchange silencer section 12 comprising one or more heat exchange silencer baffles 20 of any type outlined above, may be usefully applied in numerous applications, some of which will be outlined in more detail below. It is understood that the exemplary applications mentioned below are not comprehensive and are shown by way of example only.

Figure 8:
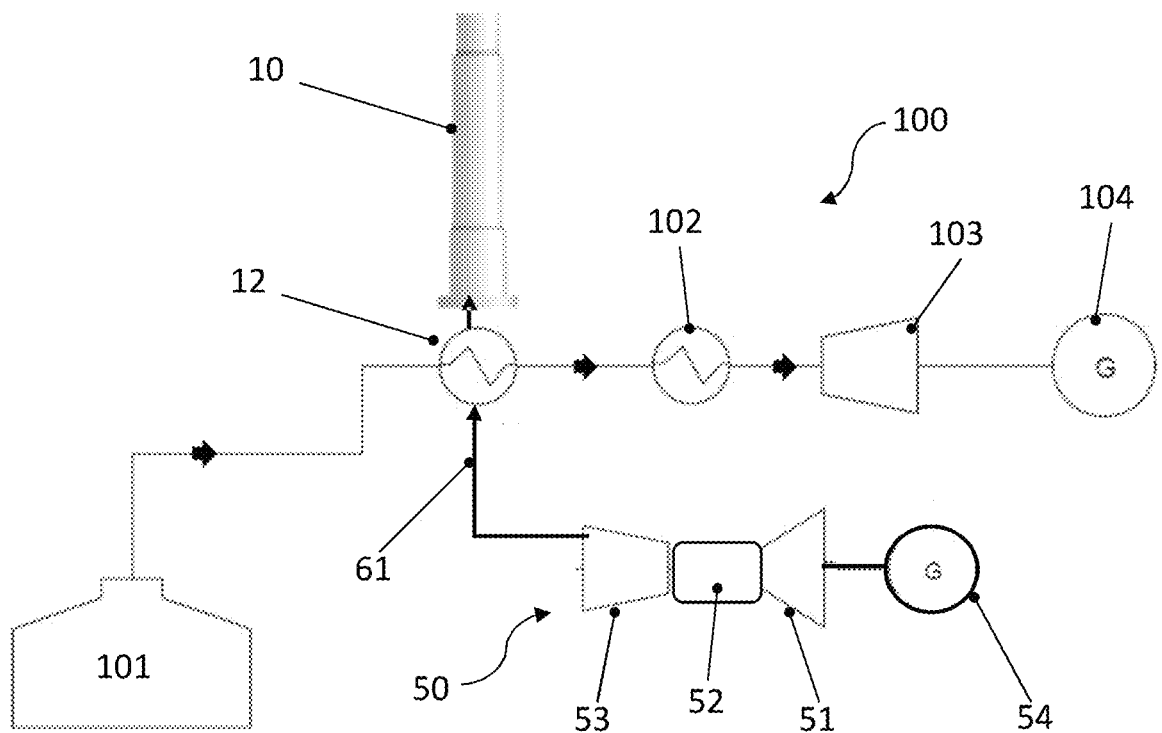
FIG. 8 a schematic view of an embodiment of a power station comprising a gas turbine engine and a Compressed Air Energy Storage plant, employing a heat exchange silencer section of the exhaust duct of the gas turbine engine to preheat the working fluid of the Compressed Air Energy Storage plant.

FIG. 8 depicts a first exemplary embodiment of the use of the above-described subject matter in a power station. The power station comprises a gas turbine engine 50 and a Compressed Air Energy Storage, also known as CAES, plant 100. Gas turbine engine 50 comprises compressor 51, combustor 52 and expansion turbine 53 and is arranged to drive a generator 54. Exhaust gases 61 from the expansion turbine 53 are discharged through a stack 10. In the flow path of exhaust gases 61, a silencer section 12 of an exhaust duct is arranged upstream of stack 10. The silencer baffles 20 inside silencer section 12 are configured as heat exchange devices, as described above.

The CAES plant 100 comprises a compressed air storage tank 101, a main air heater 102, an expansion turbine 103, and a generator 104 driven by expansion turbine 103. The heat exchange baffles 20 of silencer section 12 are fluidly interposed between compressed air storage tank 101 and main air heater 102. This is achieved in that the inlet ports of the heat exchange silencer baffles 20 inside silencer section 12 are fluidly connected to the compressed air storage tank 101, while the outlet ports of the heat exchange silencer baffles 20 are fluidly connected to expansion turbine 103 via main air heater 102. Hence, air discharged from compressed air storage tank 101, prior to being fed to main air heater 102, flows through the internal cavities 22 for receiving a heat exchange fluid inside the baffles 20 of silencer section 12.

Accordingly, when the gas turbine engine 50 and the CAES plant 100 are simultaneously operated, air discharged from compressed air storage tank 101 passes through the heat exchange baffles 20 inside silencer section 12 and is heated in heat exchange with the gas turbine engine exhaust gases 61 prior to entering the main air heater 102, thereby cooling gas turbine engine exhaust gases 61. This results in less energy being needed to heat the air to a specific temperature in the main air heater 102, while reducing the thermal energy loss associated with the exhaust gas flow 61 through stack 10, thereby enhancing overall power station efficiency. Dependent on the thermal power requirement of the CAES plant 100, the heat exchange capacity of heat exchange silencer section 12 and the match of the inlet temperature desired for CAES expansion turbine 103 and the temperature to which heat exchange silencer section 12 can heat the air discharged from compressed air storage tank 101, heat exchange silencer section 12 may serve as the main air heater for the CAES plant, and heater 102 may consequently be omitted. It is noted, however, that in an arrangement without CAES heater 102, the operation of the CAES plant 100 fully depends upon the operation of the gas turbine engine 50, whereas, with CAES heater 102 present, CAES plant 100 may be operated independent from gas turbine engine 50.

Figure 9:
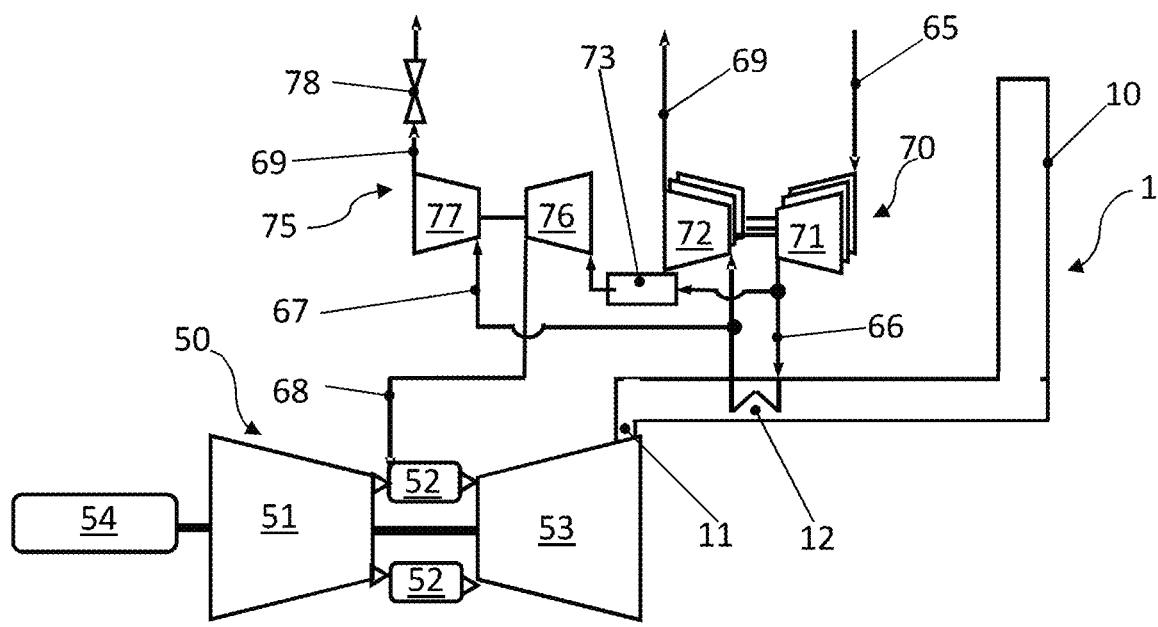
FIG. 9 a schematic view of an embodiment of a power station with turbocharger driven air injection, employing a heat exchange silencer section of the exhaust duct of the gas turbine engine to supply energy for driving the turbochargers.

A second exemplary instance of a power station making use of the herein disclosed heat exchange silencer arrangement is a gas turbine power station with turbocharger driven air injection, as is essentially described in US 2019/0195131, and is shown in FIG. 9. The power station comprises, besides gas turbine engine 50, a turbocharging appliance comprising, in the depicted exemplary embodiment, low-pressure turbochargers 70 and a high-pressure turbocharger 75. The exemplary embodiment shows three low-pressure turbochargers and one high-pressure turbocharger. As will become apparent below, on the one hand, the mass flow through the compressors of the low-pressure turbochargers 70 is higher than the mass flow through the high-pressure turbocharger 75. Moreover, due to compression of the air in the compressors 71 of the low-pressure turbochargers 70, the inlet flow of the compressor 76 of high-pressure turbocharger 75 is, even at equal mass flow, smaller than the inlet mass flow of compressors 71 of the low-pressure turbochargers 70. Accounting for these effects in adapting the number of low-pressure turbochargers allows, in principle, the use of the same type of turbocharger for the high-pressure turbocharger 75 and low-pressure turbochargers 70.

Gas turbine engine 50 discharges exhaust gas from expansion turbine 53 through transition section 11 into exhaust duct 1. Thereby, the exhaust gas passes through heat exchange silencer section 12 into stack 10. In operation, inlet air 65 is compressed by low-pressure compressors 71 and discharged from the low-pressure compressors as low-pressure compressed air 66. The compressor outlets of the low-pressure compressors 71 are fluidly connected to the inlet ports of the heat exchange silencer baffles 20 arranged inside heat exchange silencer section 12 and to the compressor inlet of the high-pressure compressor 76. Accordingly, low-pressure compressed air 66 is divided into a first partial flow flowing into the heat exchange silencer baffles 20 of heat exchange silencer section 12, while a second partial flow is supplied, via an intercooler 73, to the inlet of high-pressure compressor 76. The outlet ports of the heat exchange silencer baffles 20 arranged inside heat exchange silencer section 12 are fluidly connected to the turbine inlets of the expansion turbines 72 of the low-pressure turbochargers 70 and to the turbine inlet of the expansion turbine 77 of high-pressure turbocharger 75. Heated low-pressure compressed air 67 from heat exchange silencer section 12 thus is delivered to the expansion turbines 72 and 77, so as to be expanded in the turbines and to be discharged as discharge air 69. In expanding the heated low-pressure compressed air, the expansion turbines 72 and 77 generate the power to drive compressors 71 and 76.

The compressor outlet of high-pressure compressor 76 is fluidly connected to the combustor 52 of the gas turbine engine 50. Thus, high-pressure compressed air 68 from high-pressure compressor 76 is delivered to combustor 52, adding to the mass flow delivered to combustor 52 by the compressor 51 of the gas turbine engine. Accordingly, expansion turbine 53 of the gas turbine engine can expand a higher mass flow than delivered by compressor 51. This configuration enhances the mechanical power output from the expansion turbine 53 and/or reduces power consumption of compressor 51, resulting in more power being available to drive generator 54 for generating electric energy. The turbine outlet of the high-pressure expansion turbine 77 is fluidly connected to a back pressure control device 78, thus allowing control of the pressure of high-pressure compressed air 68.

Figure 10:
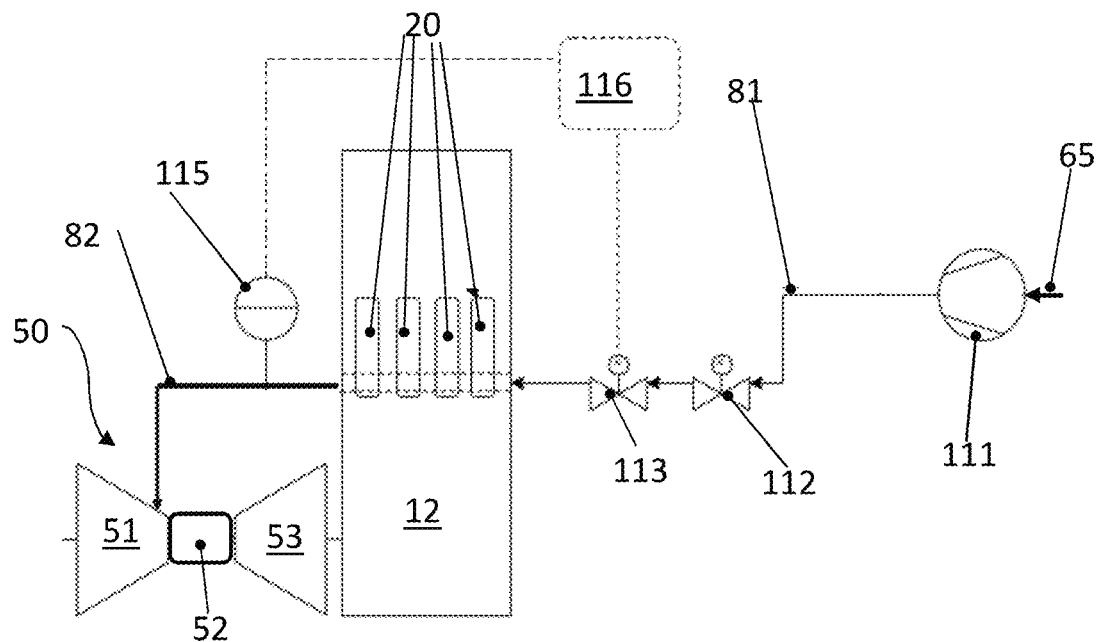
FIG. 10 a schematic view of an embodiment of a power station with an external motor-driven booster compressor, employing a heat exchange silencer section of the exhaust duct of the gas turbine engine to preheat the air from the external compressor.

A further exemplary instance of a power station incorporating the herein described subject matter is shown in FIG. 10, in which an external, motor-driven compressor 111 is used to boost the power output of gas turbine engine 50. Such an application may be found useful in periods of both low grid power demand and peak grid power demand. For instance, in times of low grid power demand, a battery is charged by means of electricity generated by a generator driven by the gas turbine engine 50. In times of peak grid power demand, said stored electric energy may be used to drive a motor which in turn drives compressor 111. In general, compressor 111 compresses inlet air 65 and feeds the resulting additional compressed air into the gas turbine engine essentially downstream or at the outlet of the compressor 51 or into the combustor 52. In any case, the outlet of compressor 111 is in fluid communication with combustor 52.

In the herein shown embodiment, the expansion turbine 53 of gas turbine engine 50 discharges the exhaust gas into an exhaust duct having a heat exchange silencer section 12 comprising heat exchange silencer baffles 20. The heat exchange silencer baffles 20, through their inlet and outlet ports, are fluidly interposed between compressor 111 and combustor 52 and are configured to receive at least a part of the fluid flow conveyed from the compressor 111 to combustor 52. Compressed air 81 from compressor 111 thus flows through heat exchange silencer baffles 20 and is fed to the gas turbine engine 50 downstream of compressor 51 as heated compressed air 82.

Temperature sensor 115 senses the temperature of the heated compressed air 82 and forwards the temperature of the heated compressed air 82 to controller 116. Through control valve 113, the controller 116 controls the mass flow of compressed air 81 through heat exchange silencer baffles 20 and adapts the mass flow of compressed air 81 to the heat available so as to achieve a desired target temperature of the heated compressed air. A stop valve 112 enables to close the line for the compressed air 81 if compressor 111 is non-operative. Due to heat exchange with the exhaust gas of the gas turbine engine 50, the compressed air 82 is introduced into the gas turbine engine 50 at an elevated temperature and hence the temperature increase of said fraction of the gas turbine engine working fluid flow through the combustor 52 is reduced. Heating the supplemental air 82 fed to the gas turbine engine 50 by compressor 111 thus reduces fuel consumption of the gas turbine engine 50.

Figure 11:
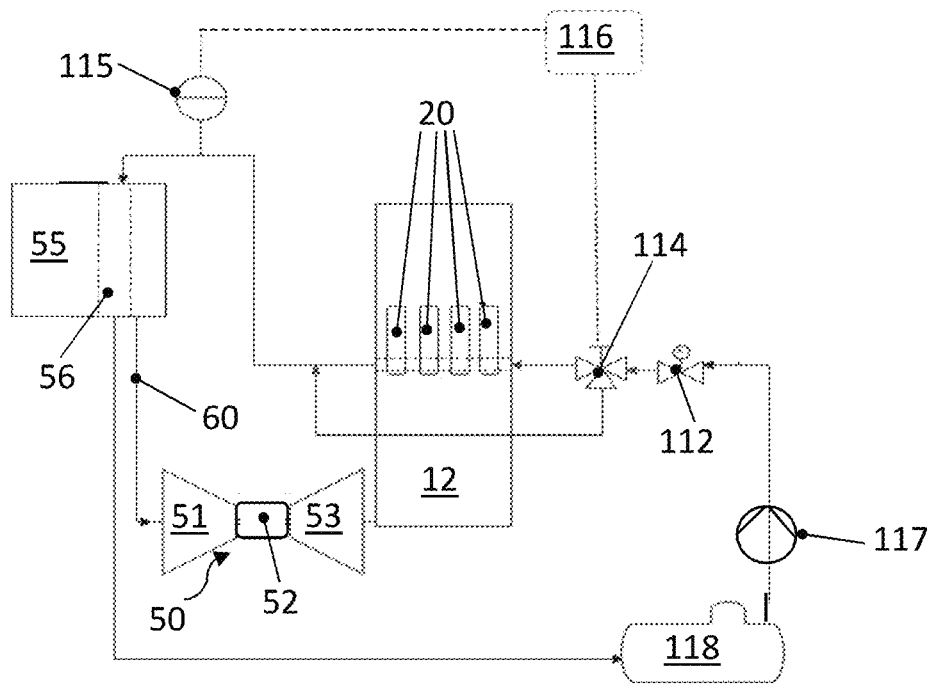
FIG. 11 a schematic view of an embodiment of a power station with gas turbine inlet air preheating, employing a heat exchange silencer section of the exhaust duct of the gas turbine engine to provide heat to the inlet air preheater.

Another exemplary instance of a power station in which a gas turbine engine with a heat exchange silencer section of the herein described type is applied to improve efficiency is shown in FIG. 11. As mentioned above, one exemplary, specific, non-limiting, embodiment of a gas turbine engine equipped with an inlet air preheat heat exchanger is disclosed in US 2018/0135467. Gas turbine engine 50 is equipped with an inlet air preheating circuit, which comprises an inlet air preheating heat exchanger 56, provided in an inlet housing 55, upstream of the compressor 51 of the gas turbine engine 50 in the working fluid flow of the gas turbine engine 50. Inlet air preheating, although increasing the power consumption of the compressor 51 of gas turbine engine 50, is known to be an efficient means when operating the gas turbine engine 50 at very low loads. In changing the temperature of inlet air 60, as well known to the person skilled in the art, the relative power output of the gas turbine engine 50 can be changed at a constant megawatts power output. Hence, the operation point can be shifted so as to achieve an overall better efficiency and improved emission values.

The heat exchange silencer baffles 20 are, through their inlet and outlet ports, integrated into the inlet air preheating circuit, so as to flow a fluid contained in the inlet air preheating circuit through the internal cavities for heat exchange fluid provided inside the heat exchange silencer baffles 20. In a manner generally familiar to a person having skill in the art, the inlet air preheating circuit comprises a pump 117, conveying fluid from a tank 118. The fluid is fed from the pump generally through heat exchange silencer baffles 20 provided inside heat exchange silencer section 12 of the exhaust duct.

During operation of the gas turbine engine, the exhaust gas from the expansion turbine 53 flows through heat exchange silencer section 12. The fluid conveyed by pump 117 and flowing through heat exchange baffles 20 thus is heated in heat exchange with the exhaust gas from the gas turbine engine 50, flows through inlet air preheating heat exchanger 56, heats the inlet air 60 flowing through the compressor 51 in heat exchange with the water, and is returned to tank 118. In the inlet air preheating circuit, downstream from the heat exchange silencer baffles 20, a temperature sensor 115 is arranged and is connected to a controller 116. Controller 116 acts on a three-way control valve 114, which controls a flow of water through a bypass line, which bypasses the heat exchange baffles 20, so as to control the temperature of the fluid entering inlet air heat exchanger 56. It should be noted that temperature sensor 115 might also be arranged in the flow of heated inlet air 60 flowing from the inlet air heat exchanger 56 to the compressor 51 of the gas turbine engine 50. In that way, the temperature of the inlet air could be directly controlled. Further, in the herein shown exemplary embodiment, the inlet air preheating circuit comprises a stop valve 112 for completely shutting down the fluid flow in the inlet air preheating circuit, to avoid eventual thermally driven convective flows that might occur even if pump 117 is shut down.

A very similar arrangement may be used to apply the exhaust heat recovery in heat exchange silencer baffles 20 for fuel preheating. In this case, the inlet air preheating heat exchanger 56 would simply be replaced with a fuel preheating heat exchanger, through which fuel instead of inlet air is fed.

Figure 12:
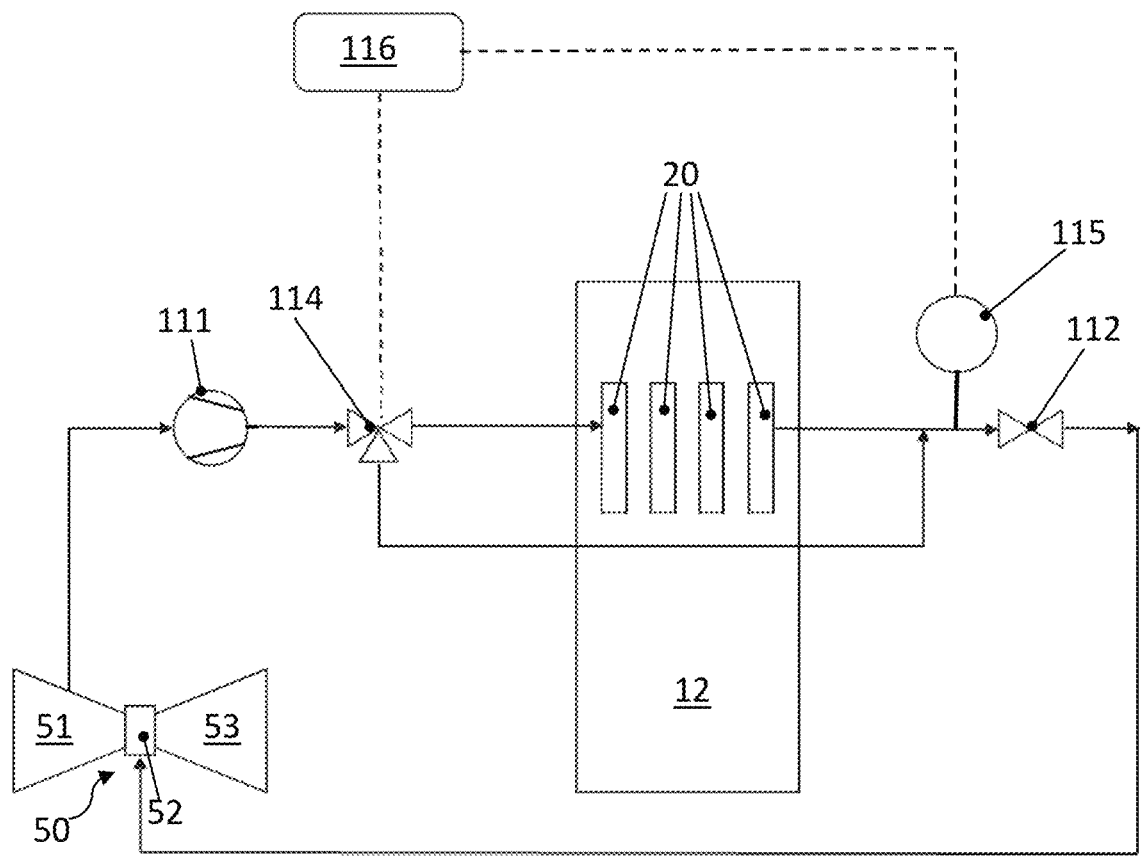
FIG. 12 a schematic view of a further embodiment of a gas turbine power station employing a heat exchange silencer section of the exhaust duct of the gas turbine engine to preheat air bled from the compressor of the gas turbine engine.

A further exemplary embodiment of a gas turbine power station making use of the herein described exhaust duct with a heat exchange silencer section is illustrated in FIG. 12. Partly compressed air is bled from compressor 51 of gas turbine engine 50 at a bleed port downstream the compressor inlet and upstream the compressor outlet and is further compressed by an external compressor 111. A high pressure outlet port of compressor 111 is fluidly connected to the inlet port of the heat exchange silencer baffles 20. Hence, compressed air from external compressor 111 flows through heat exchange baffles 20.

A further line is connected to at least one of the high pressure outlet of the compressor 51 and the combustor 52 of gas turbine engine 50, and thus fluidly connects the outlet ports of the heat exchange silencer baffles and the combustor of the gas turbine engine. Thus, the exhaust heat from gas turbine engine 50 is recuperated and reintroduced into the gas turbine engine process. A temperature sensor 115 senses the temperature of the compressed air downstream the heat exchange silencer baffles 20. The sensed temperature is forwarded to controller 116, which in turn controls three-way control valve 114. By means of three-way control valve 114, a fraction of the compressed air from compressor 111 can be bypassed around heat exchange baffles 20, thus permitting control of the temperature of the compressed air downstream the heat exchange silencer baffles 20. Stop valve 112 arranged in the flow path of the bleed air allows to close the external flow path from the bleed port through the heat exchange silencer baffles 20 to the combustor 52 of the gas turbine engine 50.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. An exhaust duct for a gas turbine engine, the exhaust duct comprising:
   a silencer section, the silencer section having an inlet and an outlet and a flow direction from the inlet to the outlet;
   the silencer section including a plurality of silencer baffles each extending from an upstream edge to a downstream edge along the flow direction, the upstream edge including a curved surface forming a bullnose section, each silencer baffle including first and second side surfaces connected by and extending from the bullnose section along the flow direction,
   a respective first side surface of a first silencer baffle of the plurality of silencer baffles and a corresponding respective second side surface of an adjacent silencer baffle of the plurality of silencer baffles defining therebetween a flow channel of the silencer section, at least one of the plurality of silencer baffles including a respective internal cavity defined by the curved surface and between the respective first and second side surfaces, the respective bullnose section further including a duct defined by the upstream edge and extending along an entire span width of the silencer baffle across the flow direction, the duct further defined by a downstream wall extending across the entire span width of the silencer baffle of the internal cavity at a downstream end of the bullnose section to prevent fluid communication between the internal duct and a remainder of the internal cavity, the respective duct being in fluid communication with a respective inlet port and a respective outlet port, the duct of the respective silencer baffle thereby being fluidly connected to an outside of the exhaust duct.

2. A gas turbine engine, wherein an exhaust side of an expansion turbine is connected to an exhaust duct according to claim 1.

3. A power station comprising at least one gas turbine engine according to claim 2, wherein the at least one gas turbine engine is equipped with an inlet air preheating circuit, wherein the inlet air preheating circuit comprises an inlet air preheat heat exchanger provided upstream of a compressor of the at least one gas turbine engine, wherein the plurality of silencer baffles are integrated into the inlet air preheating circuit via the respective inlet port and outlet port of each respective internal cavity so that a fluid contained in the inlet air preheating circuit flows through the respective duct.

4. A power station comprising at least one gas turbine engine according to claim 2, wherein the at least one gas turbine engine is equipped with a fuel preheating circuit, wherein the fuel preheating circuit comprises a fuel preheat heat exchanger provided upstream of a combustor of the at least one gas turbine engine in a fuel flow path, wherein the plurality of silencer baffles are integrated into the fuel preheating circuit via the respective inlet port and outlet port of each respective internal cavity so that a fluid contained in the fuel preheating circuit will flow through the respective duct.

* * * * *